United States Patent
Ibukuro et al.

(10) Patent No.: US 6,848,406 B2
(45) Date of Patent: Feb. 1, 2005

(54) STARTING DEVICE FOR VEHICULAR ENGINE

(75) Inventors: Hideo Ibukuro, Saitama (JP); Makoto Fujikubo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/646,742

(22) Filed: Aug. 25, 2003

(65) Prior Publication Data

US 2004/0065287 A1 Apr. 8, 2004

(30) Foreign Application Priority Data

Sep. 11, 2002 (JP) ........................................ 2002-266070

(51) Int. Cl.[7] ............................ F02N 11/00; F02N 17/00
(52) U.S. Cl. ................................................. 123/179.25
(58) Field of Search ......................... 123/179.25, 179.26

(56) References Cited

U.S. PATENT DOCUMENTS

| | | | | |
|---|---|---|---|---|
| 4,848,170 A | * | 7/1989 | Inagaki et al. | 123/179.25 |
| 4,909,200 A | * | 3/1990 | Sumi | 123/179.24 |
| 5,495,833 A | * | 3/1996 | Ishizaka et al. | 123/179.25 |
| 5,966,985 A | * | 10/1999 | Shuto et al. | 123/179.25 |
| 6,305,337 B1 | * | 10/2001 | Sumi et al. | 123/179.25 |
| 2002/0062703 A1 | * | 5/2002 | Arakawa | 74/337.5 |
| 2003/0047156 A1 | * | 3/2003 | Holweg | 123/179.25 |
| 2004/0104074 A1 | * | 6/2004 | Nakai et al. | 184/6.5 |

FOREIGN PATENT DOCUMENTS

JP           07-071217 A        3/1995

* cited by examiner

Primary Examiner—Henry C. Yuen
Assistant Examiner—Arnold Castro
(74) Attorney, Agent, or Firm—Birch, Stewart, Kolasch & Birch, LLP

(57) ABSTRACT

A starting motor is mounted to an approximately central portion of an engine body along the axis of a crankshaft. An over-running clutch is mounted to a first end portion of the crankshaft at a position where a starting clutch is sandwiched between the over-running clutch and the starting motor. A starting gear reducer having gears respectively fixed to both ends of a rotational shaft overlapping the starting clutch 39 is provided between the starting motor and the over-running clutch. A rotor of a generator is connected to the other end of the crankshaft. The aforementioned arrangement provides a starting device for a vehicular engine in which a rotor of a generator is connected to the crankshaft, an over-running clutch for inputting a rotational power from the starting motor to the crankshaft is mounted to the crankshaft, and the starting clutch is mounted to the first end of a main shaft forming part of a transmission, wherein the device is intended to suppress the amount the engine body projects outward on the generator side of the engine.

16 Claims, 13 Drawing Sheets

STARTING DEVICE FOR VEHICULAR ENGINE

CROSS-REFERENCES TO RELATED APPLICATIONS

This nonprovisional application claims priority under 35 U.S.C. § 119(a) on Patent Application No. 2002-266070 filed in Japan on Sep. 11, 2002, the entirety of which is herein incorporated by reference.

BACKGROUND OF THE INVENTION

1. Field of the Invention

The present invention relates to a starting device for a vehicular engine in which a generator rotor is connected to a crankshaft rotatably supported by a crankcase forming part of an engine body; and more particularly to a starting device for an engine in which an over-running clutch for inputting rotational power from a starting motor having a rotational axis parallel to that of the crankshaft and mounted to the engine body is mounted to the crankshaft, and a starting clutch is interposed between the crankshaft and a main shaft having an axis parallel to that of the crankshaft and the starting clutch forms a part of a transmission and is mounted to one end of the main shaft.

2. Description of the Background Art

A related engine of the background art has been shown and described in Japanese Patent No. 3134676. In the above-described engine, the engine projects unfavorably from the engine body on the side provided with the generator since a rotor of the generator is mounted to an end portion of the crankshaft and the over-running clutch is mounted to the crankshaft at a position immediately inside the rotor. Accordingly, the present inventors have determined that it is difficult to increase the bank angle of the engine when the engine is mounted to a motorcycle on the side provided with the generator.

SUMMARY OF THE INVENTION

The present invention overcomes the shortcomings associated with the background art and achieves other advantages not realized by the background art.

An object of the present invention is to provide a starting device for a vehicular engine that is capable of suppressing the amount that an engine body projects from the side provided with a generator.

One or more of these and other objects are accomplished by an engine for a vehicle comprising an engine body having a cylinder block, a lower case, a cylinder head and a cylinder head cover; a plurality of pistons slidably fit within cylinders and being connected to a crankshaft via connecting rods; a rotor of a generator being connected to a first end of the crankshaft rotatably supported by a crankcase forming part of the engine body; a starting motor having a rotational axis, the starting motor being mounted at an approximately central portion of the engine body along a rotational axis of the crankshaft; an over-running clutch for inputting a rotational power from the starting motor, the rotational axis of the starting motor being parallel to the rotational axis of the crankshaft, wherein the over-running clutch is mounted to the engine body through a second end of the crankshaft; and a starting clutch being interposed between the crankshaft and a main shaft having a rotational axis parallel to the rotational axis of the crankshaft, the starting clutch being mounted to a first end of the main shaft, wherein the starting motor is disposed within an angular range defined by a cylinder axis (C) of the cylinders of the engine body and a straight line connecting the rotational axis of the crankshaft to the rotational axis of the main shaft, and along a plane perpendicular to the rotational axis of the crankshaft.

One or more of these and other objects are further accomplished by a method of setting a bank angle of an engine on a motorcycle at a relatively high value, wherein the engine includes an engine having an engine body having a cylinder block, a lower case, a cylinder head and a cylinder head cover; a plurality of pistons slidably fit within cylinders and being connected to a crankshaft via connecting rods; a rotor of a generator being connected to a first end of the crankshaft rotatably supported by a crankcase forming part of the engine body; a starting motor having a rotational axis, the starting motor being mounted at an approximately central portion of the engine body along a rotational axis of the crankshaft; an over-running clutch for inputting a rotational power from the starting motor, the rotational axis of the starting motor being parallel to the rotational axis of the crankshaft, wherein the over-running clutch is mounted to the engine body through a second end of the crankshaft; and a starting clutch, the method comprising mounting the starting clutch between the crankshaft and a main shaft having a rotational axis parallel to the rotational axis of the crankshaft, and mounting the starting clutch to a first end of the main shaft, and mounting the starting motor in a position disposed within an angular range defined by a cylinder axis (C) of the cylinders of the engine body and a straight line connecting the rotational axis of the crankshaft to the rotational axis of the main shaft, and along a plane perpendicular to the rotational axis of the crankshaft.

Since the generator and the over-running clutch are disposed at both the ends of the crankshaft, it is possible to reduce the projecting amount of the engine body on the generator side, and also possible to set the bank angle of the engine when the engine is mounted on a motorcycle at a relatively large value.

It is also possible to reduce the amount the crankshaft projects from the crankcase, and to improve the engine output due to the increased engine speed. Since the starting motor is mounted at an approximately central portion of the engine body along the axis of the crankshaft, it is possible to prevent an imbalance in weight of the engine along the axis of the crankshaft from being caused by mounting of the starting motor.

In addition, since the over-running clutch is disposed at a position where the starting clutch is sandwiched between the over-running clutch and the starting motor in the axial direction of the crankshaft, and the starting gear reducer including the gears fixed to both the ends of the rotational shaft crossing the starting clutch is provided between the starting motor and the over-running clutch, it is possible to dispose the starting clutch, e.g., the main shaft of the transmission, at a relatively high position.

The present inventors have determined that it desirable to dispose the starting clutch, e.g., the main shaft of the transmission, at a higher position to provide a compact transmission structure between the crankshaft and the transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
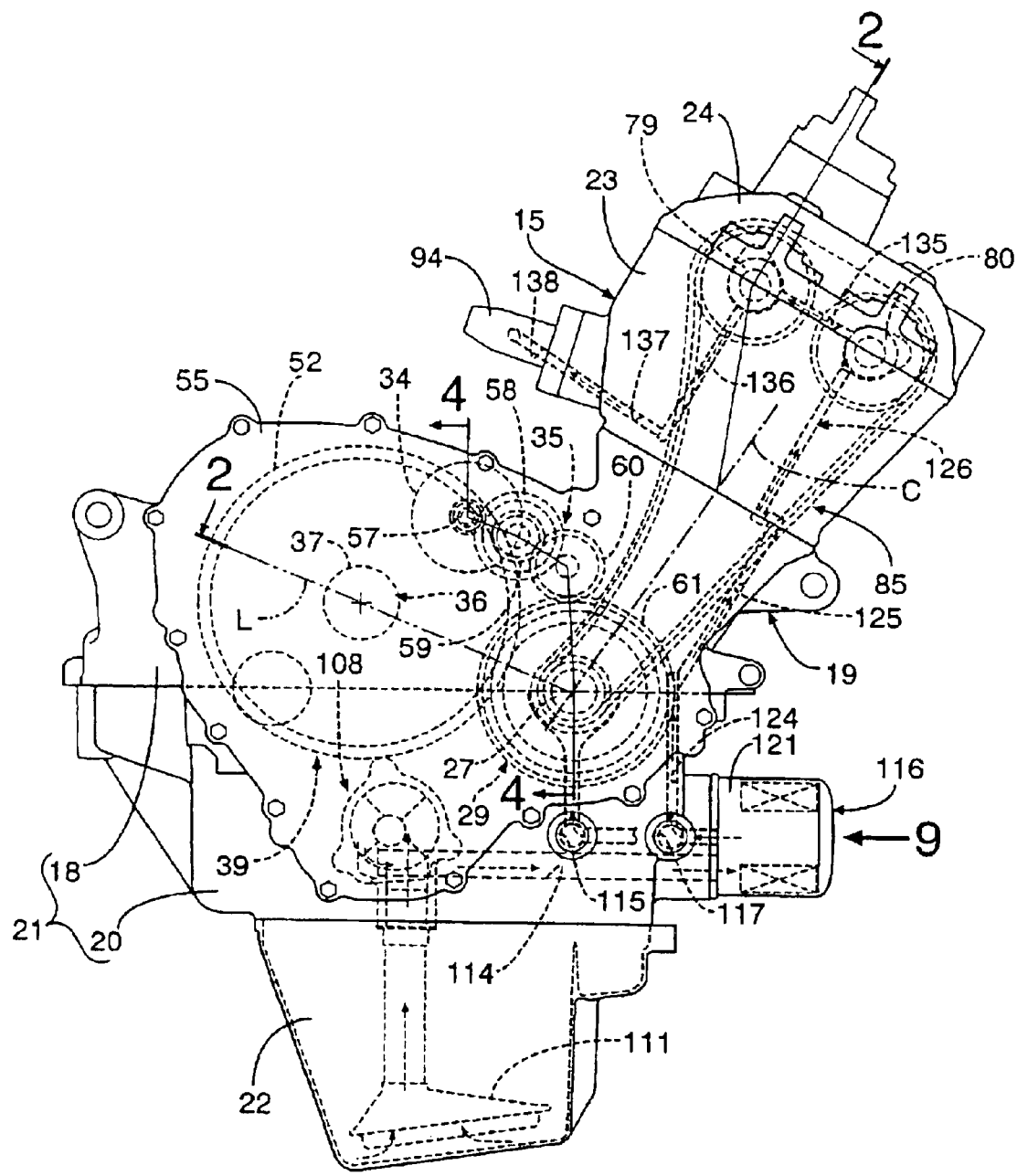
FIG. 1 is a side view an partial sectional view of an engine according to an embodiment of the present invention.
Figure 2:
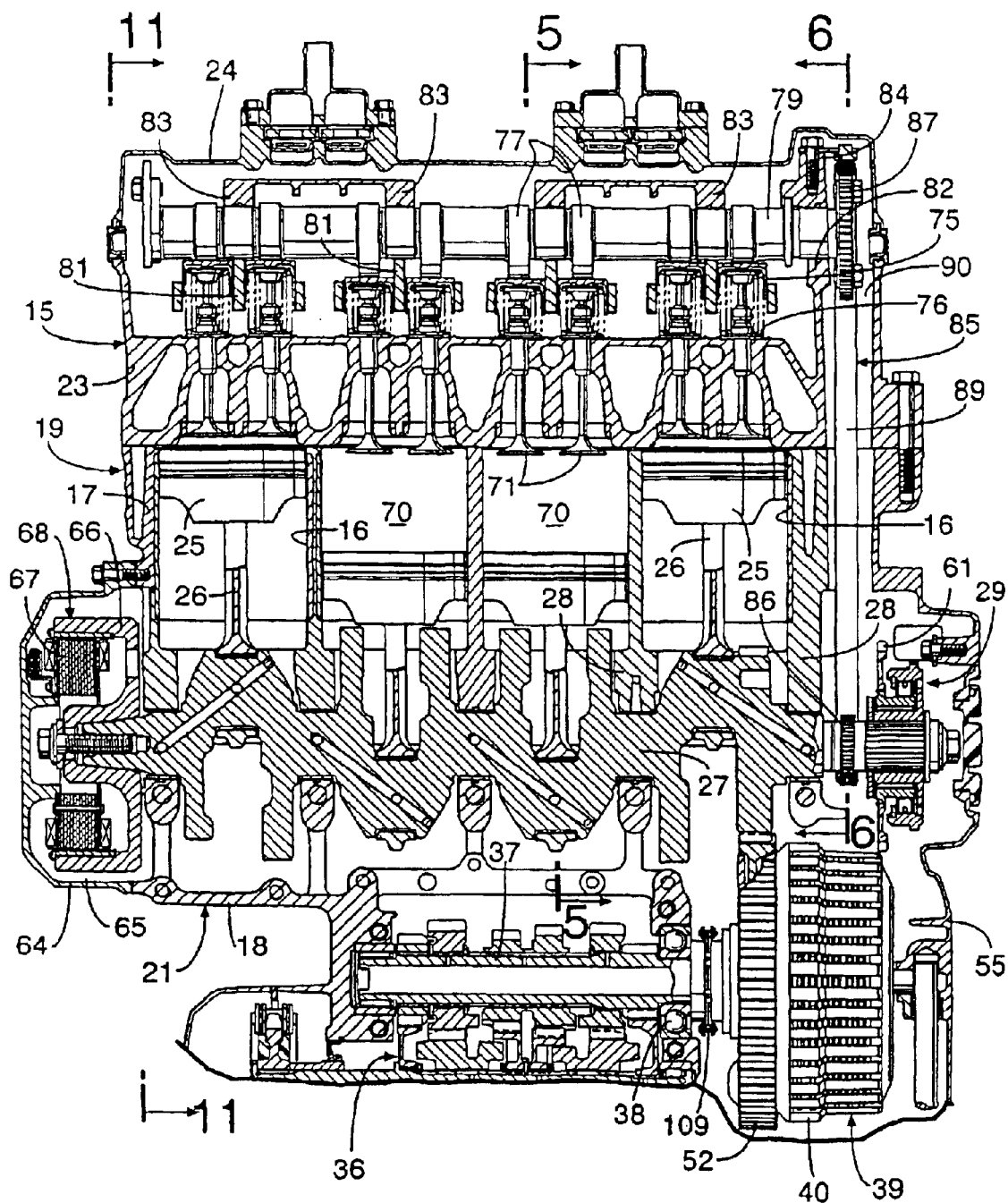
FIG. 2 is a sectional view taken along line 2—2 of FIG. 1.
Figure 3:
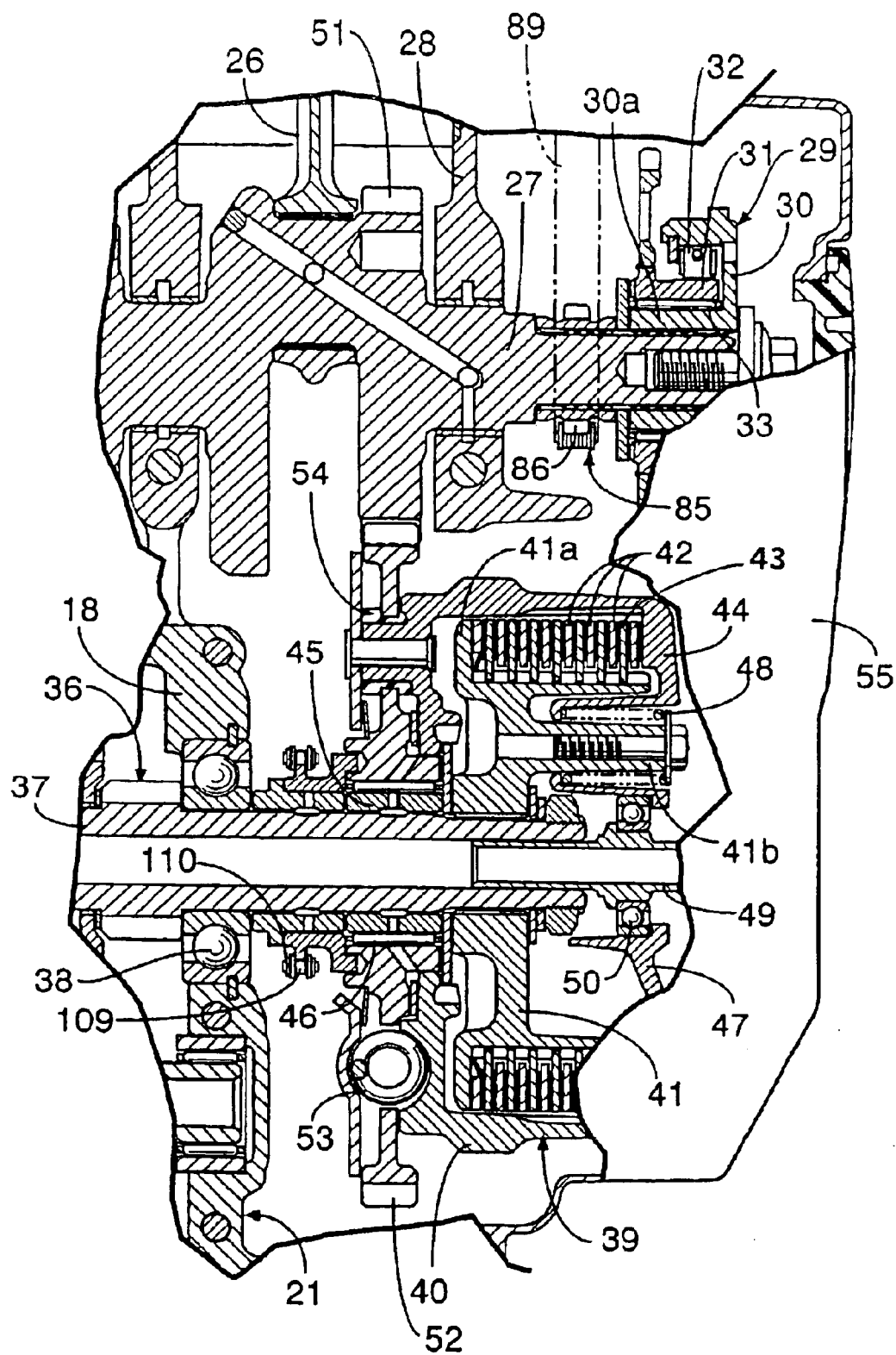
FIG. 3 is an enlarged view of a portion shown in FIG. 2.
Figure 4:
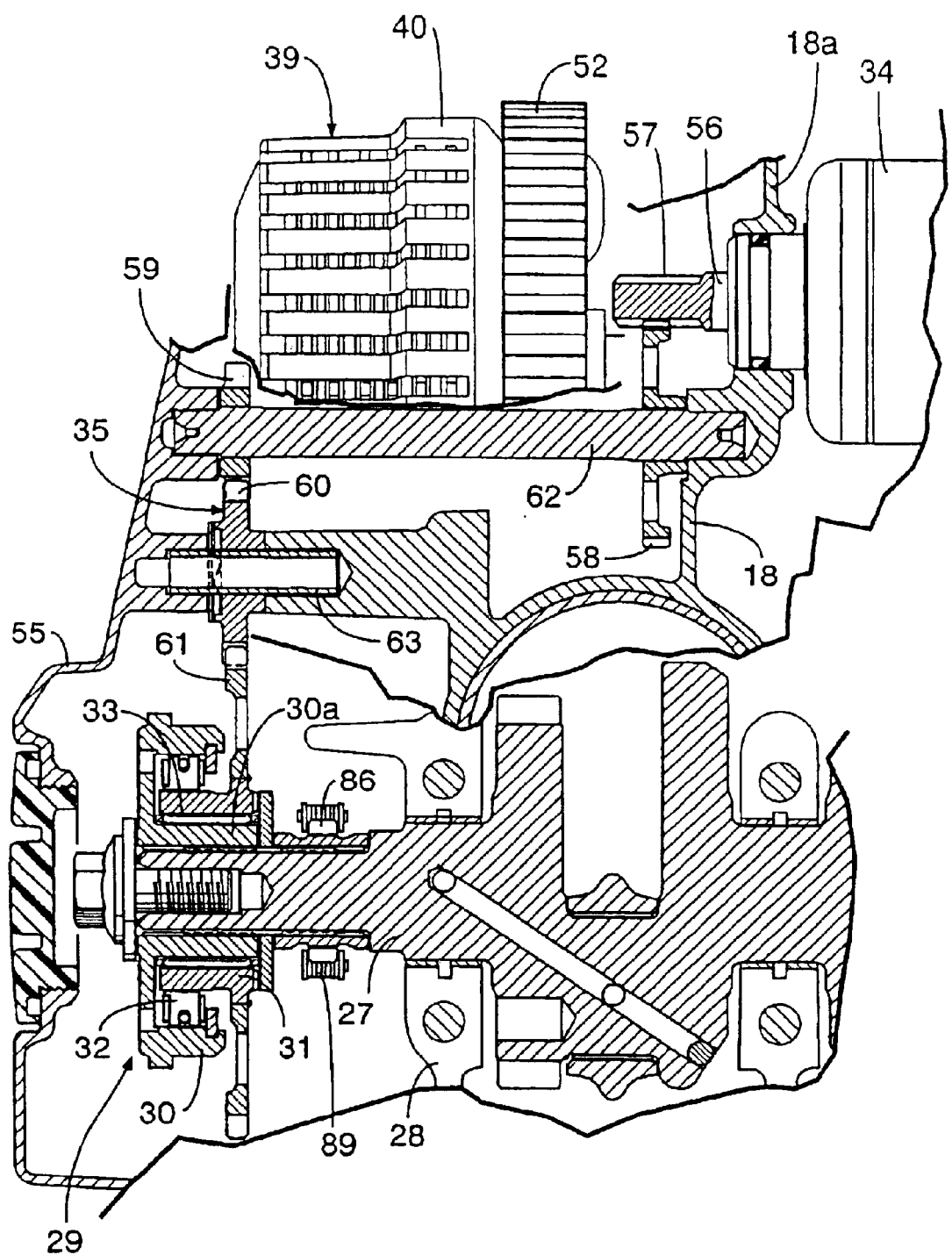
FIG. 4 is an enlarged sectional view taken along line 4—4 of FIG. 1.
Figure 5:
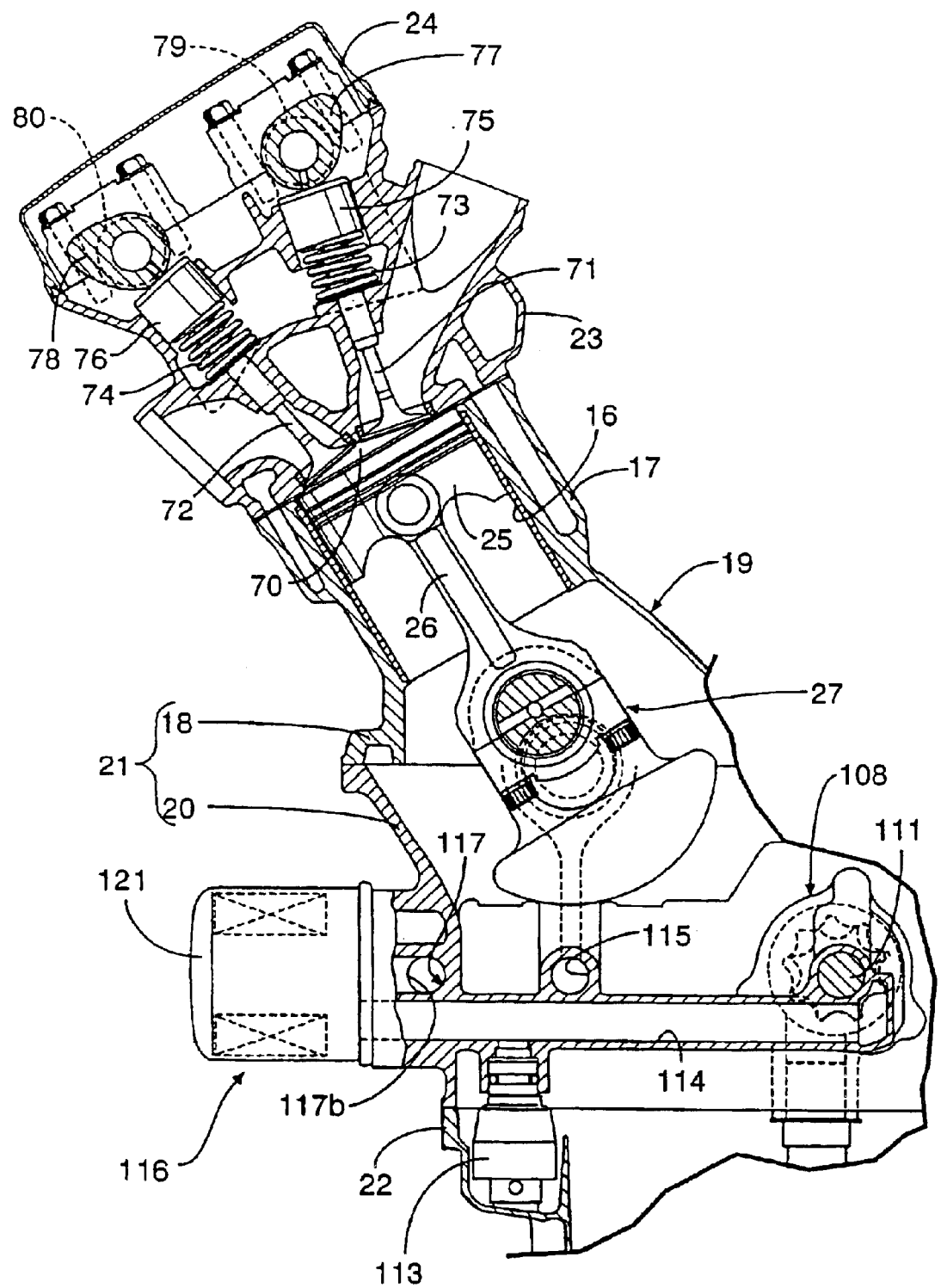
FIG. 5 is an enlarged sectional view taken along line 5—5 of FIG. 2.
Figure 6:
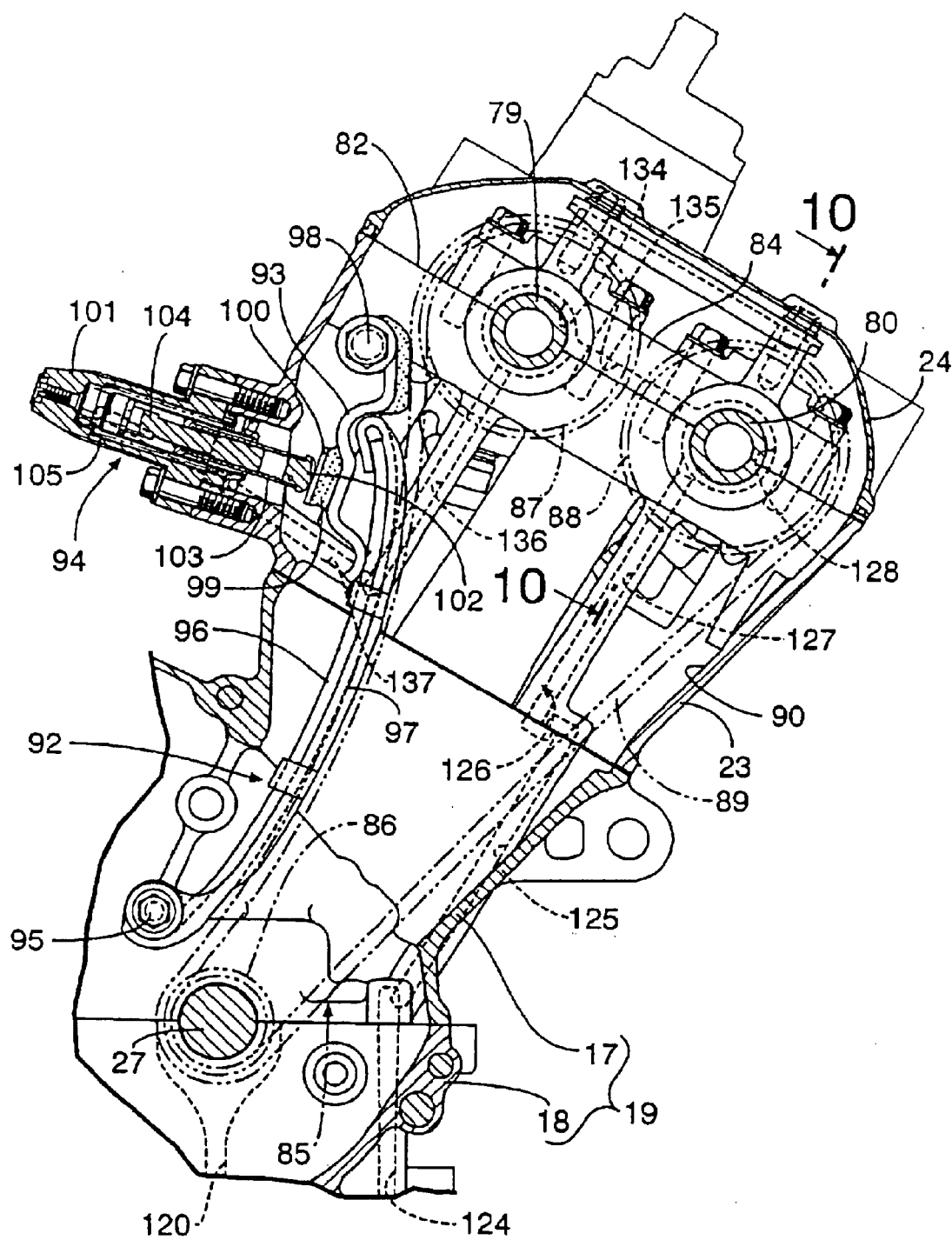
FIG. 6 is an enlarged sectional view taken along line 6—6 of FIG. 2.
Figure 7:
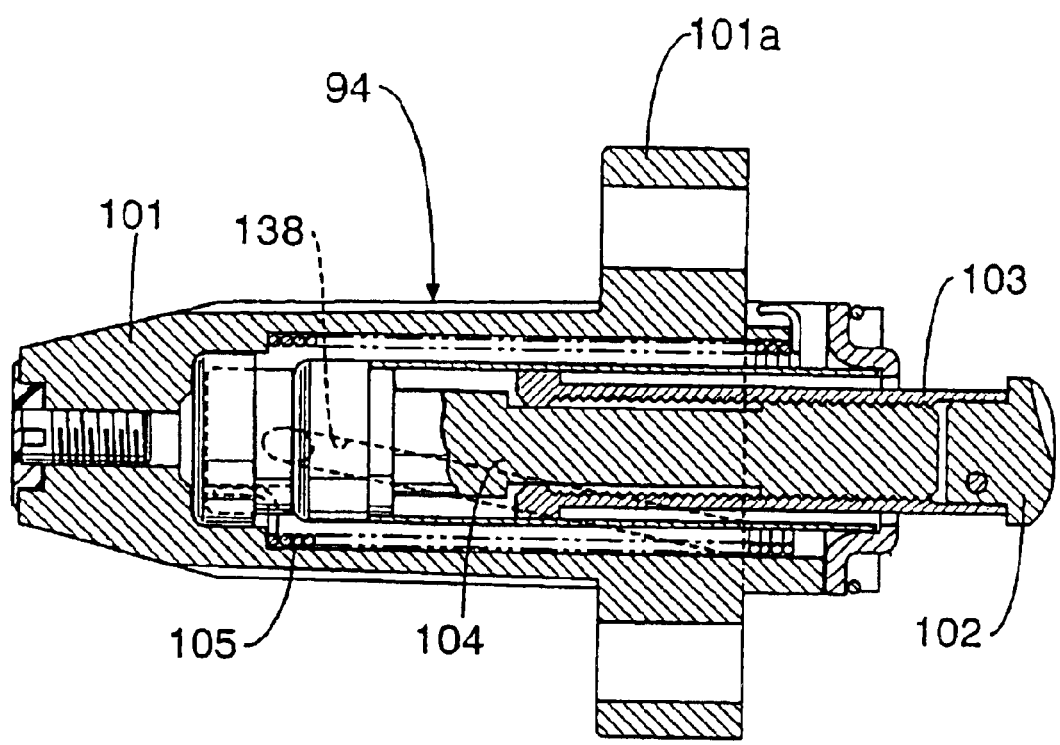
FIG. 7 is an enlarged longitudinal sectional view of a screw type lifter.
Figure 8:
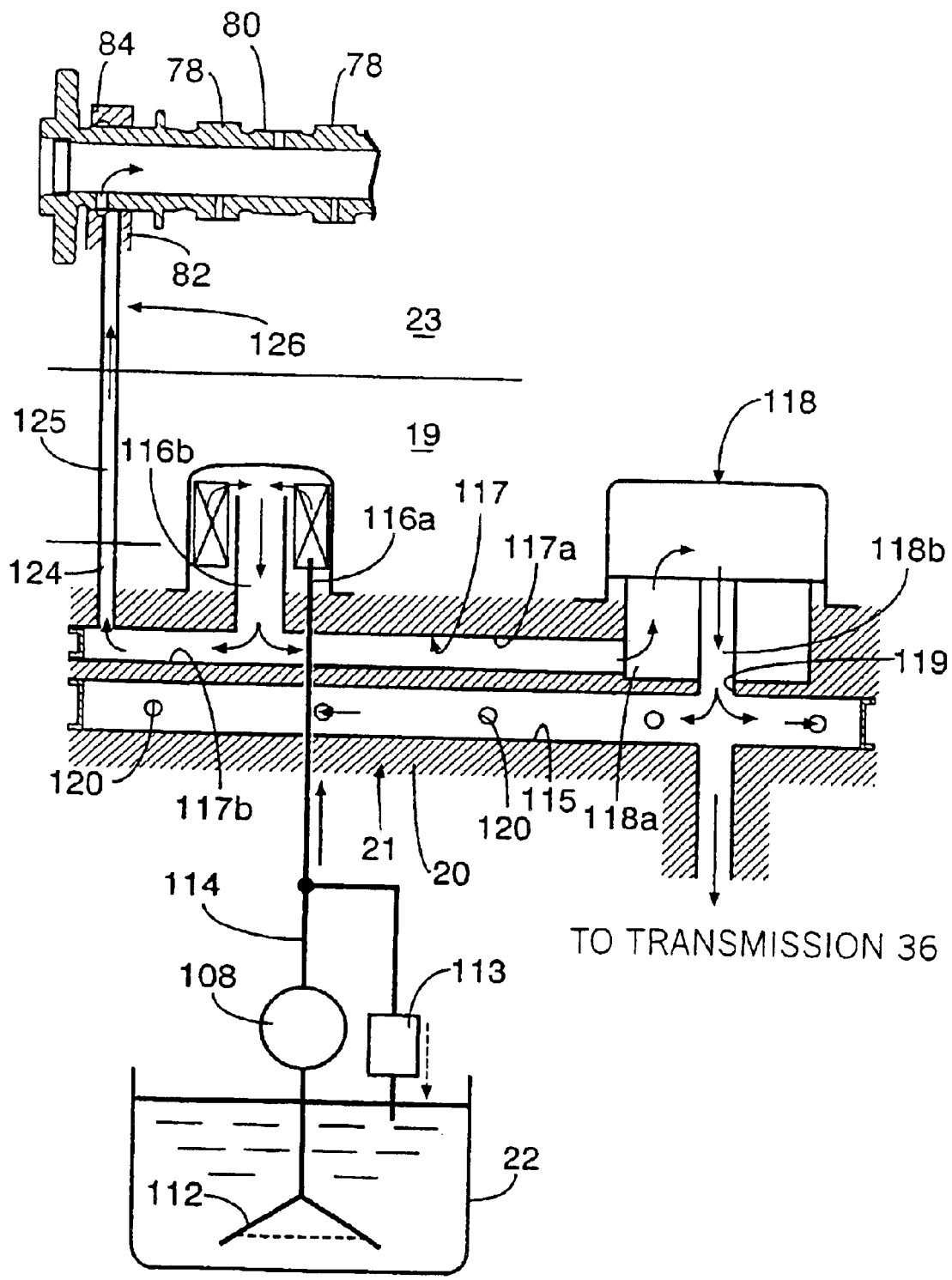
FIG. 8 is a schematic view showing oil feeding lines from an oil pump to a main gallery and a sub-gallery.
Figure 9:
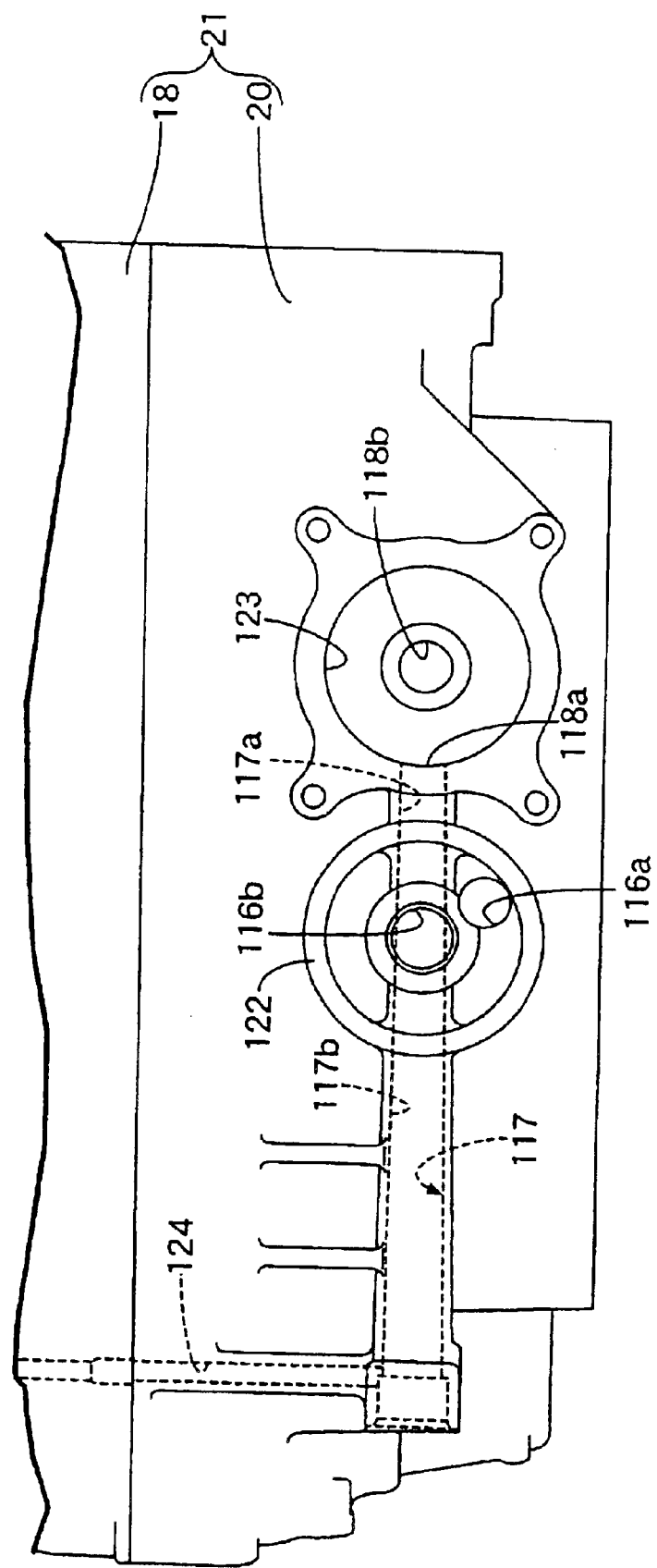
FIG. 9 is a view of a crankcase taken along arrow 9 in FIG. 1.
Figure 10:
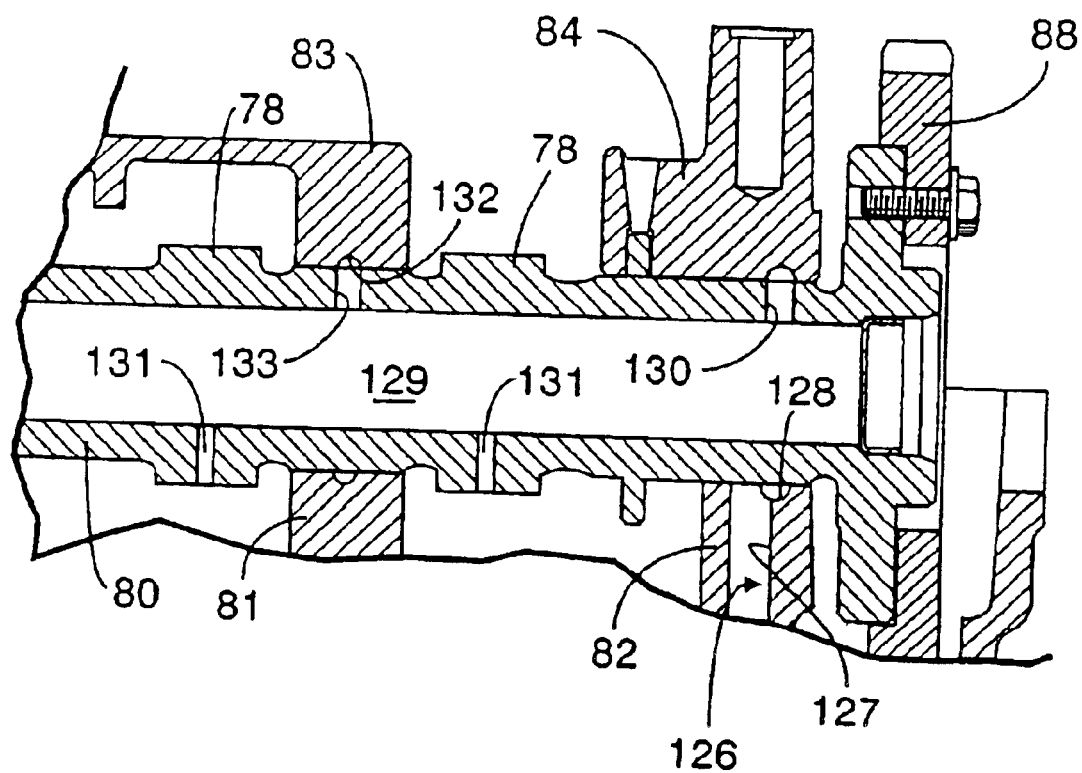
FIG. 10 is a sectional view taken along line 10—10 in FIG. 6.
Figure 11:
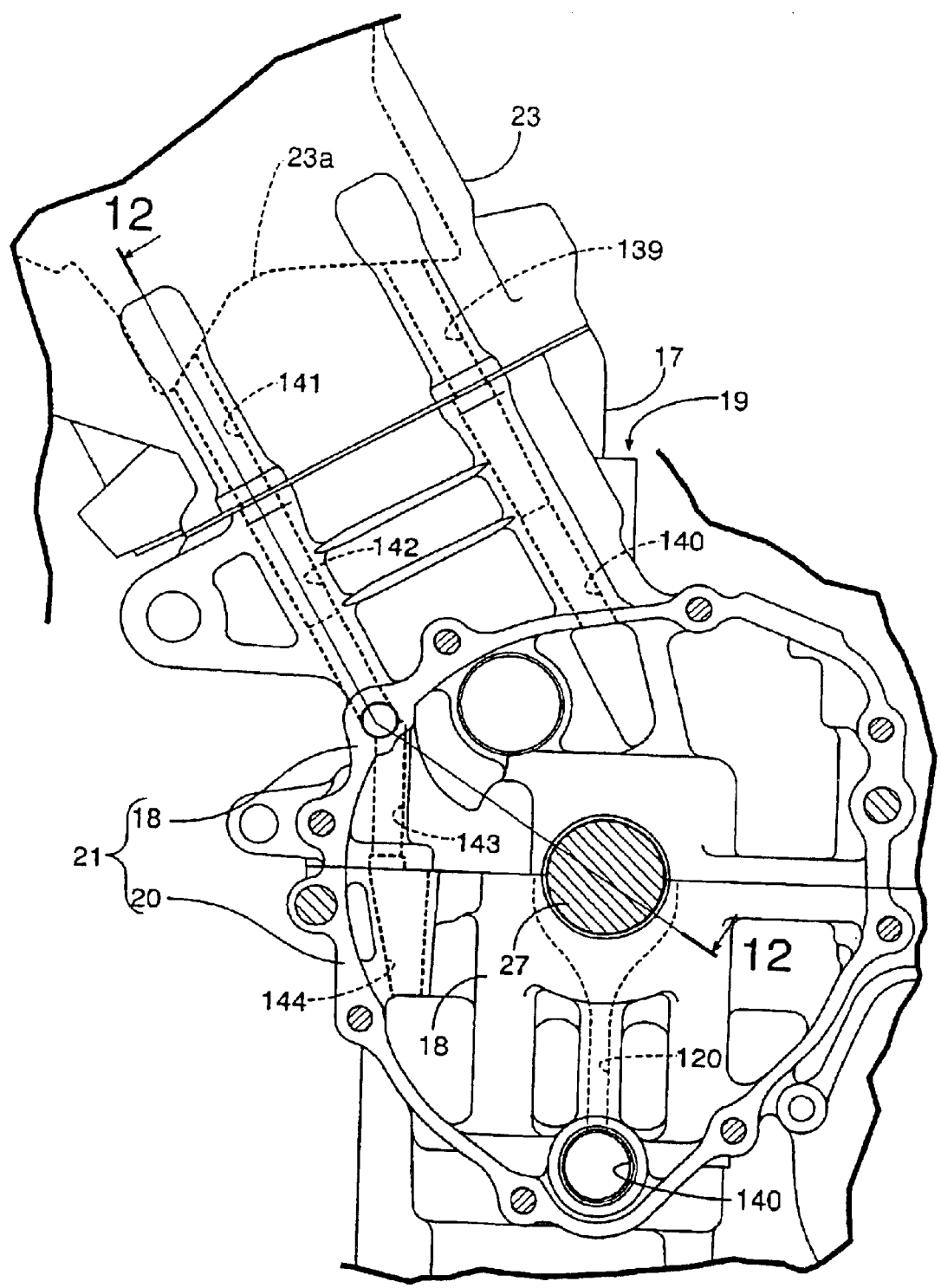
FIG. 11 is a sectional view taken along line 11—11 in FIG. 2.
Figure 12:
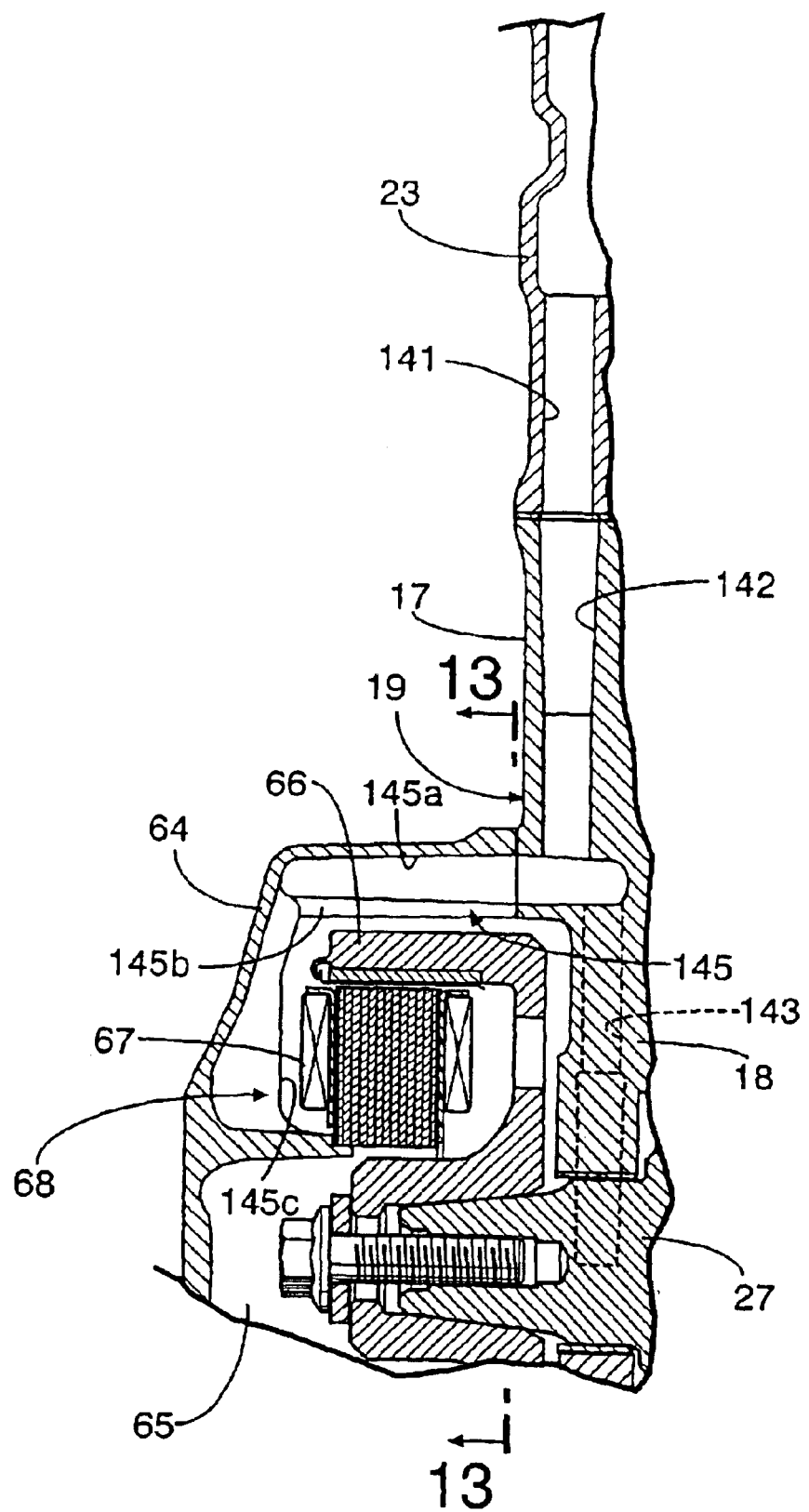
FIG. 12 is a sectional view taken along line 12—12 in FIG. 11.
Figure 13:
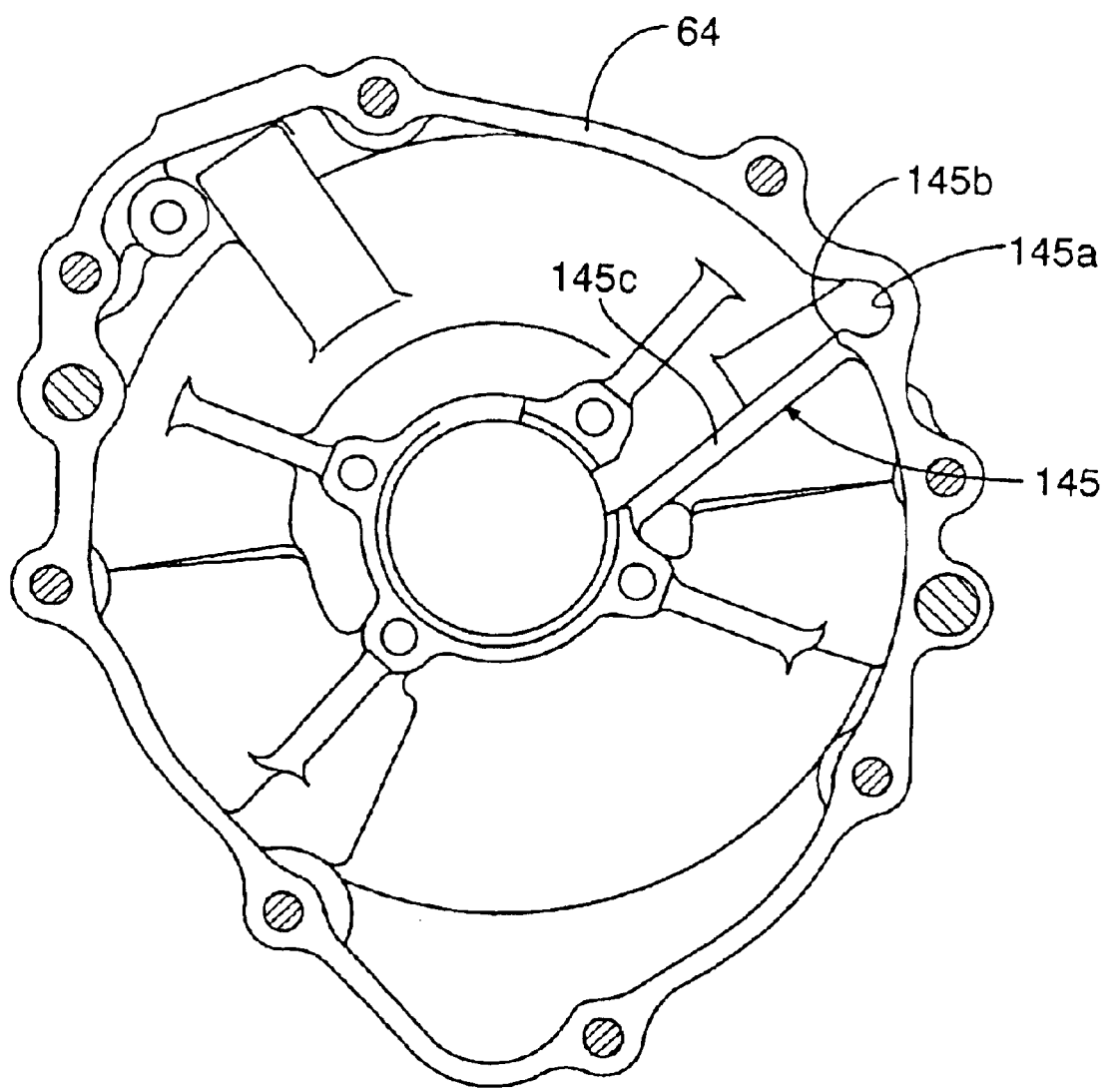
FIG. 13 is a view of a generator cover taken along line 13—13 in FIG. 12.

The present invention will hereinafter be described with reference to the accompanying drawings. FIGS. 1 to 13 show a first embodiment of the present invention. FIG. 1 is a side view an partial sectional view of an engine according to an embodiment of the present invention. FIG. 2 is a sectional view taken along line 2—2 of FIG. 1. FIG. 3 is an enlarged view of a portion shown in FIG. 2. FIG. 4 is an enlarged sectional view taken along line 4—4 of FIG. 1. FIG. 5 is an enlarged sectional view taken along line 5—5 of FIG. 2. FIG. 6 is an enlarged sectional view taken along line 6—6 of FIG. 2. FIG. 7 is an enlarged longitudinal sectional view of a screw type lifter. FIG. 8 is a schematic view showing oil feeding lines from an oil pump to a main gallery and a sub-gallery. FIG. 9 is a view of a crankcase taken along arrow 9 in FIG. 1. FIG. 10 is a sectional view taken along line 10—10 in FIG. 6. FIG. 11 is a sectional view taken along line 11—11 in FIG. 2. FIG. 12 is a sectional view taken along line 12—12 in FIG. 11. FIG. 13 is a view of a generator cover taken along line 13—13 in FIG. 12.

As seen in FIGS. 1 and 2, there is shown an in-line four-cylinder engine according to the present invention. This type of engine is typically mounted on a motorcycle. The engine includes an engine body 15 having a cylinder axis C tilting in upward and forward directions. The engine body 15 includes a cylinder block 19, a lower case 20, an oil pan 22, a cylinder head 23, and a head cover 24. The cylinder block 19 has a cylinder portion 17 having four cylinder bores 16 arranged in line and an upper case portion 18 integrally continuous to the bottom of the cylinder portion 17. The lower case 20 is joined to the bottom of the cylinder block 19 in such a manner as to form a crankcase 21 in cooperation with the upper case portion 18. The oil pan 22 is joined to the bottom of the lower case 20, e.g., the crankcase 21. The cylinder head 23 is joined to the top of the cylinder block 19 and the head cover 24 is joined to the top of the cylinder head 23.

Pistons 25 are slidably fitted within the cylinder bores 16 and are connected to a crankshaft 27 via connecting rods 26, respectively. The crankshaft 27 is rotatably supported by a plurality of crank journal walls 28 provided on the crankcase 21.

As shown in FIGS. 3 and 4, an over-running clutch 29 is provided on one end side of the crankshaft 27 in the axial direction (or on the front end side of the motorcycle along the running direction in this embodiment). Specifically, the front end portion of the crankshaft 27 projects from the crank journal wall 28 located on the front end side, and the over-running clutch 29 is mounted to the front end portion of the crankshaft 27.

The over-running clutch 29 is a common type of clutch including a clutch outer 30, a clutch inner 31, and a plurality of sprags interposed between the clutch outer 30 and the clutch inner 31. The clutch outer 30 has cylindrical hubs 30a fixed to one end portion of the crankshaft 27. The clutch inner 31 is relatively rotatably supported by a needle bearing 33 interposed between the hub 30a and the clutch inner 31. When the clutch inner 31 is normally rotated, the sprags 32 are raised to connect the clutch inner 31 to the clutch outer 30.

A starting motor 34 is mounted to the upper case portion 18 of the crankcase 21 of the engine body 15. The over-running clutch 29 having a rotational axis parallel to that of the crankshaft 27 is adapted to input a rotational power of the starting motor 34 to the crankshaft 27. A starting gear reducer 35 is provided between the starting motor 34 and the over-running clutch 29.

Power outputted from the crankshaft 27 is speed-reduced by a transmission 36, and is transmitted to a rear wheel, e.g., a drive wheel. A main shaft 37 of the transmission 36, which has an axis parallel to that of the crankshaft 27, is rotatably supported by the upper case portion 18 of the crankcase 21 via a ball bearing 38 or the like.

A starting clutch 39 interposed between the crankshaft 27 and the main shaft 37 is mounted to one end of the main shaft 37. The starting clutch 39 includes a clutch housing 40, a clutch center 41, a plurality of friction plates 42, a plurality of friction plates 43, and a pressing plate 44. The clutch housing 40 is relatively rotatably supported by the main shaft 37 and is formed into a cylindrical shape with its bottom closed. The clutch center 41 is coaxially contained in the clutch housing 40 in such a manner as to be fixed to the main shaft 37. The friction plates 42 are spline-fitted in the inner periphery of the clutch housing 40. The friction plates 43 are axially slidably fitted in the outer periphery of the clutch center 41 in such a manner as to be alternately overlapped to the friction plates 42. The pressing plate 44 is provided for pressing the friction plates 42 and 43 to a pressure receiving plate 41a provided on the clutch center 41.

The clutch housing 40 is rotatably supported by a cylindrical sleeve 45 mounted to the main shaft 37 via a needle bearing 46. The clutch housing 40 is thus rotatable relative to the main shaft 37. The pressing plate 44 is integrally formed on a release plate 47. A plurality of supporting shafts 41b passing through the release plate 47 are integrally provided on the clutch center 41. Coil-shaped clutch springs 48, each surrounding the corresponding supporting shaft 41b, are interposed between the release plate 47 and the clutch center 41. The release plate 47 is rotatably supported by a release rod 49 via a release bearing 50. The release rod 49 is inserted in the main shaft 37 in such a manner as to be axially movable relative to the main shaft 37.

In response to axial movement of the release rod 49, the starting clutch 39 switches the states of connection and disconnection between the clutch housing 40 and the clutch center 41 to each other. In the connection state, the friction plates 42 and 43 are pressed between the pressure receiving plate 41a and the pressing plate 44, to connect the clutch center 41 to the clutch housing 40. In the disconnection state, the friction plates 42 and 43 are free to move between the pressure receiving plate 41a and the pressing plate 44, to disconnect the clutch center 41 from the clutch housing 40.

A drive gear 51 is integrally formed on the crankshaft 27 at a position located inside the above-described crank journal wall 28 on the first end side of the crankshaft 27. A driven gear 52 meshing with the drive gear 51 is connected to the clutch housing 40 of the starting clutch 39 via a damper spring 53 and an elastic member 54. When the starting clutch 39 switches the disconnection state to the connection state, a power from the crankshaft 27 is transmitted to the main shaft 37 via the drive gear 51, driven gear 52 and the starting clutch 39.

The over-running clutch 29 and the starting clutch 39 are located at positions projecting from side walls of the cylinder block 19 and the lower case 20 on the right side wall of the motorcycle along the running direction in this embodiment and on the first end side of the crankshaft 27 in the axial direction. A cover 55 for covering the over-running clutch 29 and the starting clutch 39 is fastened to the side walls of the cylinder block 19 and the lower case 20.

A supporting wall 18a is provided on the upper case portion 18 of the crankcase 21 in such a manner as to be located at a position corresponding to an approximately central portion of the engine body 15 along the axis of the crankshaft 27. The starting motor 34 is mounted to the supporting wall 18a. In this case, on the figure projected on a plane perpendicular to the axis of the crankshaft 27, the starting motor 34 is disposed within a region surrounded by the cylinder axis C and a straight line L connecting the axis of the crankshaft 27 and the axis of the main shaft 37 to each other. Further, as seen in the side view of the first end side of the crankshaft 27 in the axial direction, the starting motor 34 is disposed behind the starting clutch 39 in such a manner that part of the starting motor 34 is overlapped to the starting clutch 39.

The starting motor 34 is disposed at an approximately central portion of the engine body 15 along the axis of the crankshaft 27 in such a manner as to sandwich the starting clutch 39 between the over-running clutch 29 and the starting motor 34 in the direction along the axis of the crankshaft 27.

The starting gear reducer 35 includes a pinion 57, a large-diameter gear 58, a small-diameter gear 59, an idle gear 60, and a ring gear 61. The pinion 57 is fixed to an output shaft 56 of the starting motor 34. The large-diameter gear 58 meshes with the pinion 57. The small-diameter gear 59 rotates integrally with the large-diameter gear 58. The idle gear 60 meshes with the small-diameter gear 59. The ring gear 61 is fixed to the clutch inner 31 of the over-running clutch 29 in such a manner as to mesh with the idle gear 60. An output of the starting motor 34 is speed-reduced in three steps, e.g., by a first reduction step between the pinion 57 and the large-diameter gear 58, a second reduction step between the small-diameter gear 59 and the idle gear 60, and a third reduction step between the idle gear 60 and the ring gear 61. The output of the starting motor 34 is then transmitted to the crankshaft 27 via the over-running clutch 29.

A rotational shaft 62 crossing over the starting clutch 39 is rotatably supported by the supporting wall 18a and the cover 55. The large-diameter 58 and the small-diameter gear 59 are fixed to both ends of the rotational shaft 62, respectively. The idle gear 60 is rotatably supported by a supporting shaft 63 supported by the upper case portion 18 and the cover 55.

As shown in FIG. 2, a generator chamber 65 is formed by a side wall of the cylinder block 19 on the other side of the crankshaft 27 in the axial direction and a generator cover 64 fastened to the cylinder block 19. The other end portion of the crankshaft 27 projects into the generator chamber 65 and a rotor 66 is fixed to the other end portion of the crankshaft 27 in the generator chamber 65. A stator 67 is surrounded by the rotor 66 and is fixed to the inner surface of the generator cover 64. The rotor 66 and the stator 67 form a generator 68.

As particularly shown in FIG. 5, corresponding piston 25 faces respectively face combustion chambers 70 that are formed between the cylinder portion 17 of the cylinder block 19 and the cylinder head 23. Intake valves 71 and exhaust valves 72 that can be opened and closed are mounted in the cylinder head 23 in such a manner that a pair of the intake valve 71 and exhaust valve 72 are disposed for each of the combustion chambers 70. The intake valves 71 and the exhaust valves 72 are biased in the valve closed direction by spring forces of valve springs 73 and 74, respectively.

Each lifter 75 being in contact with the top of the corresponding intake valve 71 is fitted in the cylinder head 23 in such a manner as to be slidable in a direction along the valve opening/closing direction, e.g., the axial direction of the intake valve 71. Similarly, each lifter 76 being in contact with the top of the corresponding exhaust valve 72 is fitted in the cylinder head 23 in such a manner as to be slidable in a direction along the valve opening/closing direction, e.g., the axial direction of the exhaust valve 72.

An intake side cam 77 is in sliding-contact with the upper surface, opposite to the intake valve 71, of the corresponding lifter 75, and an exhaust side cam 78 is in sliding-contact with the upper surface, opposite to the exhaust valve 72, of the corresponding lifter 76. The intake side cams 77 are integrally provided on an intake side camshaft 79, and the exhaust side cams 78 are integrally provided on an exhaust side camshaft 80.

Cam journal walls 81, each of which are common to the intake side camshaft 79 and the exhaust side camshaft 80 and are disposed at a position corresponding to that of each combustion chamber 70, are integrally provided in the cylinder head 23. Similarly, a cam journal wall 82, which is common to the intake side camshaft 79 and the exhaust side camshaft 80 and is located on the one end side of the camshafts 79 and 80 along the axial direction, is integrally provided in the cylinder head 23. Four cam holders 83, each of which are common to the intake side camshaft 79 and the exhaust side camshaft 80, are fastened to the cam journal walls 81. A cam holder 84, which is common to the intake side camshaft 79 and the exhaust side camshaft 80, is fastened to the cam journal wall 82. The intake side camshaft 79 and the exhaust camshaft 80 are rotatably supported by the cam holders 83 and 84 and the cam journal walls 81 and 82. In addition, each pair of the cam holders 83 are integrated with each other.

As particularly shown in FIG. 6, a timing transmission 85 is provided for speed-reducing a rotational power of the crankshaft 27 in half and transmitting the resultant rotational power to the intake side camshaft 79 and the exhaust side camshaft 80. The timing transmission 85 includes a drive sprocket 86, a driven sprocket 87, a driven sprocket 88, and an endless cam chain 89. The drive sprocket 86 is fixed to the crankshaft 27 at a position between the crank journal wall 28 on the one end side of the crankshaft 27 in the axial direction and the over-running clutch 29. The driven sprocket 87 is fixed to one end of the intake side camshaft 79. The driven sprocket 88 is fixed to one end of the exhaust side camshaft 80. The endless cam chain 89 is wound around the sprockets 86, 87, and 88. The drive sprocket 86 and a lower portion of the cam chain 89 are contained between the cylinder block 19 and the cover 55. An upper portion of the cam chain 89 is contained in a runnable manner in a cam chain chamber 90 provided in the cylinder head 23.

A chain tensioner 91 including a tensioner arm 92, a control arm 93, and a tensioner lifter 94 is provided for giving a constant tension to a portion of the cam chain 89 on the loosened side, e.g., on the side between the drive sprocket 86 and the driven sprocket 87. The tensioner arm 92 includes a tensioner arm body 96 and a shoe 97 made from a synthetic resin. The tensioner arm body 96 is swingably supported by the cylinder block 19 via a first pivot 95 located in the vicinity of the drive sprocket 86. The shoe 97 is mounted to the tensioner arm body 96 in such a manner as to be in sliding-contact with the outer surface of the portion, on the loosened side, of the cam chain 89. The tensioner arm body 96 is made from spring steel in the form of a strip arched to the outer surface of the portion of the cam chain 89 on the loosened side. The shoe 97 is formed so as to cover the front surface of the tensioner arm body 96.

Similar to the tensioner arm body 96, the control arm 93 is made from spring steel. The base end of the control arm 93 is swingably supported by the cylinder head 23 via a second pivot 98 located in the vicinity of the driven sprocket 87. The swingable end of the control arm 93 comes into contact with the back surface of the swingable end of the tensioner arm body 96. A pressure receiving plate 100 is joined to the back surface of an intermediate portion of the control arm 93 via a cushion material such as rubber. The tensioner lifter 94 is mounted to the cylinder head 23 in such a manner as to bias the pressure receiving plate 100 to the tensioner arm 92 side.

As shown in FIG. 7, the tensioner lifter 94 is a common type of tensioner lifter including a lifter case 101, a hollow lifter rod 103, a screw shaft 104, and a torsional coil spring 105. The lifter case 101 has a flange 101a fastened to the cylinder head 23. The lifter rod 103 has at its leading end a pressing portion 102 adapted to be brought into contact with the pressure receiving plate 100. The lifter rod 103 is supported in the lifter case 101 and is not permitted to rotate. The screw shaft 104 is screwed in the hollow portion of the lifter rod 103. The torsional coil spring 105 spirally biases the screw shaft 104 in the lifter case 101 in the advance direction of the lifter rod 103. In this tensioner lifter 94, a torsional force of the torsional coil spring 105 is converted and amplified into a thrust load by the screw shaft 104, which thrust load biases the lifter rod 103 to the control arm 93 side.

An oil pump 108 having a rotational axis parallel to that of the crankshaft 27 is mounted to the lower case 20 of the crankcase 21. An endless chain 110 is wound around a sprocket 109 relatively unrotatably engaged with the clutch housing 40 of the starting clutch 39 and a sprocket (not shown) fixed to a rotational shaft 111 of the oil pump 108.

As particularly shown in FIG. 8, oil in the oil pan 22 is pumped up by an oil pump 108 via an oil strainer 112, and is discharged from the oil pump 108 to a discharge passage 114 provided in the lower case 20. A relief valve 113 is interposed between the discharge passage 114 and the oil pan 22 to keep the oil pressure in the discharge passage 114 at a constant value.

Oil is fed from a main gallery 115 to portions to be lubricated between the crank journal walls 18 and the crankshaft 27 and to the transmission 36. The main gallery 115 is provided in the lower case 20 of the crankcase 21. Specifically, the main gallery 115 is connected to a discharge port of the oil pump 108 via an oil filter 116 and an oil cooler 118. Passages 120 for leading oil to the portions to be lubricated between the crank journal walls 18 and the crankshaft 27 are provided in the lower case 20 in such a manner as to be communicated to the main gallery 115.

A sub-gallery 117 for leading oil to the cylinder head 23 side is provided in the lower case 20 of the crankcase 21. The sub-gallery 117 is connected to an outlet 116b of the oil filter 116 in parallel to the main gallery 115. The sub-gallery 117 is composed of a first passage portion 117a and a second passage portion 117b. The first passage portion 117a extends in straight line so as to communicate the outlet 116b of the oil filter 116 to the oil cooler 118. The second passage portion 117b extends in straight line in the direction opposite to that of the first passage portion 117a. The discharge port 114 is connected to an inlet 116a of the oil filter 116. Oil is fed into the oil cooler 118 through the first passage portion 117a communicated with the outlet 116b of the oil filter 116, and is led to the main gallery 115 via a communication passage 119. The communication passage 119 is provided in the lower case 20 in such a manner as to be coaxially communicated to an outlet 118b provided at a center portion of oil cooler 118.

The sub-gallery 117 and the main gallery 115 are connected by the outlet 118b of the oil cooler 118 and are provided in the lower case 20 of the crankcase 21 in such a manner that the axis of each of the sub-gallery 117 and the main gallery 115 is parallel to that of the crankshaft 27. The discharge passage 114 is disposed under both the main gallery 115 and the sub-gallery 117 in such a manner that the axis thereof is perpendicular to the main gallery 115 and the sub-gallery 117. In addition, the center line of the sub-gallery 117, the center line of the main gallery 115, the center line of the communication passage 119, and the center axes of the oil filter 116 and the oil cooler 118 are all located within the same plane.

As shown in FIG. 9, the oil filter 116 and the oil cooler 118 are mounted to an outer wall surface of the crankcase 21, e.g., on an outer wall surface of a front portion of the lower case 20 along the running direction of the motorcycle in this embodiment. A circular mounting seat 122, to which a housing 121 of the oil filter 116 is to be mounted, is provided on the outer wall surface of the lower case 20 of the crankcase 21. A circular outlet 116b communicated with the sub-gallery 117 is provided at a center portion of the mounting seat 122. An inlet 116a communicated with the discharge passage 114 is provided in the mounting seat 122 at a position eccentric from the outlet 116b.

A circular recess 123, in which part of a housing (not shown) of the oil cooler 118 is to be fitted, is provided in the outer wall surface of the lower case 20 at a position adjacent to the mounting seat 122. The first passage portion 117a of the sub-gallery 117 is opened in the inner side surface of the circular recess 123, and the opening portion is taken as an inlet 118a of the oil cooler 118. The outlet 118b is opened in a central portion of the circular recess 123, and the outlet is communicated to the main gallery 115 via the communication passage 119.

An oil passage 124 extending upwardly from one end of the sub-gallery 117 is provided in the crankcase 21 on the one end side of the crankshaft 27 along the axial direction. The oil passage 124 is communicated to an oil passage 126 extending around the cylinder head 23 via an oil passage 125 provided in the cylinder portion 17 of the cylinder block 19. The oil passage 126 extending around the cylinder head 23 includes a communication passage 127. The communication passage 127 is provided in a specific cam journal wall of the cam journal walls 81 and 82 provided in the cylinder head 23. The specific cam journal wall is the cam journal wall 82 on the first end side of the crankshaft 27 in the axial direction. The communication passage 127 extends in straight line so as to be communicated to the oil passage 125 provided in the cylinder portion 17.

As shown in FIG. 10, an annular groove 128 surrounding the exhaust side camshaft 80 is provided in both the cam journal wall 82 and the cam holder 84 fastened to the cam journal wall 82. The upper end of the above-described communication passage 127 is opened in the annular groove 128. A lubricating oil passage 129 closed at both ends of the exhaust side camshaft 80 is coaxially provided in the exhaust side camshaft 80. A communication hole 130 for communicating the annular groove 128 to the lubricating oil passage 129 is provided in the exhaust side camshaft 80. Lubricating oil holes 131, which have the outer ends opened in side surfaces of respective exhaust side cams 78 and the inner ends communicated to the lubricating oil passage 129, are provided in the exhaust side camshaft 80. Annular grooves 132 surrounding the exhaust side camshaft 80 are provided in the other cam journal walls 81 and the other cam holders 83. Communication holes 133 for communicating the lubricating oil passage 129 to the annular grooves 132 are provided in the exhaust side camshaft 80.

Oil led from the sub-gallery 117 is thus fed in the lubricating oil passage 129 provided in the exhaust side camshaft 80. The oil is then fed from the lubricating oil passage 129 to sliding-contact portions between the exhaust side cams 78 and the lifters 76 and sliding-contact portions between the exhaust side camshaft 80 and the cam journal walls 81 and 82 and the cam holders 83 and 84. The oil passage 126 extending around the cylinder head 23 passes through the sliding-contact portions between the intake side camshaft 79 and the exhaust side camshaft 80 and the cam journal wall 82 and the cam holder 84. It is to be noted that the cam journal wall 82 is the specific one cam journal wall of the cam journal walls 81 and 82, and the cam holder 84 is the specific cam holder of the plurality of cam holders 83 and 84.

The above-described annular groove 128 provided in the cam journal wall 82 and the cam holder 84 in such a manner as to surround the exhaust side camshaft 80 is communicated to an annular groove 134 provided in the cam journal wall 82 and the cam holder 84 in such a manner as to surround the intake side camshaft 79 by means of a communication groove 135 provided in at least one of the connection faces of the cam journal wall 82 and the cam holder 84 to the cylinder head 23 (the connection face of the cam holder 84 in this embodiment). A communication passage 136 communicated to the annular groove 134 is provided in straight line in the cam journal wall 82 in such a manner as to extend in parallel to the communication passage 127.

The lubrication for the intake side camshaft 79 side is performed by the same lubricating structure as that of the exhaust side camshaft 80. Oil led from the annular groove 134 into the intake side camshaft 79 is fed to the sliding-contact portions between the intake side cams 77 and the lifters 75 and the sliding-contact portions between the intake side camshaft 79 and the cam journal walls 81 and 82 and the cam holders 83 and 84.

The oil passage 126 extending around the cylinder head 23 includes a passage 137 provided in the cylinder head 23 in such a manner as to be communicated to the communication passage 127. The communication passage 137 is communicated to a passage 138 provided in the lifter housing 101 of the screw type lifter 94. The passage 138 is opened in the lifter housing 101. In this way, the downward end of the oil passage 126 extending round in the cylinder head 23 is communicated to the screw type lifter 94.

Oil fed through the oil passage 126 extending round in the cylinder head 23 is returned from the cylinder head 23 to the oil pan 22 side. As shown in FIG. 11, an upper surface 23a of the cylinder head 23 is formed into a triangular shape projecting upwardly in order to separate oil into the intake side camshaft 79 side and the exhaust side camshaft 80 side.

The oil after flowing on the intake side camshaft 79 side is returned to the oil pan 22 side through oil passages 139 and 140. The oil passages 139 and 140 are provided in the cylinder head 23 and the cylinder block 19 in such a manner as to be coaxial with each other. On the other side, the oil is returned to the oil pan 22 side by way of the inside of the generator chamber 65 after flowing on the exhaust side camshaft 80 side. A head side return oil passage 141 opened in the upper surface of the cylinder head 23 is provided in the cylinder head 23. A block side return oil passage 142 communicated to the head side return oil passage 141 is provided in the cylinder block 19 in such a manner as to be communicated to the inside of the generator chamber 65.

As particularly shown in FIG. 12, a branch oil passage 143 communicated to an intermediate portion of the block side return oil passage 142 is provided in the cylinder block 19. The branch oil passage 143 allows part of oil flowing in the block side return oil passage 142 to bypass the generator chamber 65 and to flow to the oil pan 22 side. The branch oil passage 143 is provided in the upper case portion 18 of the crankcase 21. A return oil passage 144 extending in the vertical direction is provided in the lower case 20 in such a manner that the upper end thereof is communicated to the branch oil passage 143 and the lower end thereof is opened in the oil pan 22. The block side return oil passage 142 is opened to the connection face of the generator cover 64 to the cylinder block 19. A guide portion 145 for leading the oil having led from the block side return oil passage 142 to the stator 67 side of the generator 68 is formed in the generator cover 64.

As particularly shown in FIG. 13, the guide portion 145 includes a groove portion 145a, a gutter portion 145b, and a wall portion 145c. The groove portion 145a is provided in the inner side surface of the generator cover 64 with its one end communicated to the block side return oil passage 142. The groove portion 145a extends to the closed end side of the generator cover 64. The gutter portion 145b is formed at the lower edge of the groove portion 145a. The wall portion 145c is provided on the closed end of the generator cover 64 in such a manner as to extend radially inwardly from the other end of the groove portion 145a.

The function of this embodiment will be described in greater detail hereinafter. The generator 68 and the over-running clutch 29 are positioned divided at opposite ends of the crankshaft 27. This reduces the projecting amount of the engine body 15 on the generator 68 side to allow the bank angle of the engine when the engine is mounted on a motorcycle to be set at a relatively large value. This also relatively reduces the projecting amount of the crankshaft 27 from the crankcase 21 to contribute the improvement of the engine output due to the increased engine speed.

On the figure projected on the plane perpendicular to the axis of the crankshaft 27, the starting motor 34 is disposed within an angle range surrounded by the cylinder axis C of the engine body 15 and the straight line connecting the crankshaft 27 to the main shaft 37. More specifically, the starting motor 34 is mounted at an approximately central portion of the engine body 15 along the axis of the crankshaft 27. This prevents the imbalance in weight of the engine along the axis of the crankshaft 27 from being caused by mounting of the starting motor 34.

The over-running clutch 29 is mounted to the one end portion of the crankshaft 27 at a position where the starting clutch 39 is sandwiched between the over-running clutch 29 and the starting motor 34 in the axial direction of the crankshaft 27. The starting gear reducer 35 is provided between the starting motor 34 and the overrunning clutch 29. The starting gear reducer 35 includes the large-diameter gear 58 and the small-diameter gear 59 fixed to both the ends of the rotational shaft 62. The rotational shaft 62 crosses the starting clutch 39, and is rotatably supported by the engine body 15. This allows the starting clutch 39, e.g., the main shaft 37 of the transmission 36 to be disposed at a relatively high position, and to make the transmission structure between the crankshaft 27 and the transmission 36 more compact.

When viewing the first end side of the crankshaft 27 with respect to the axial direction, it is seen that the starting motor 34 is disposed behind the starting clutch 38 in such a manner that part of the starting motor 34 overlaps the starting clutch 39. This allows the starting clutch 39, e.g., the main shaft 37 of the transmission 36 to be disposed at a relatively high position, and to make the transmission structure between the crankshaft 27 and the transmission 36 more compact.

The main gallery 115 connected to the discharge port of the oil pump 108 via the oil filer 116 and the oil cooler 118 is provided in the crankcase 21. The sub-gallery 117 connected to the outlet 116b of the oil filer 116 in parallel to the main gallery 115 so as to introduce oil to the cylinder head 23 side is provided in the crankcase 21.

The oil to be fed to the cylinder head 23 side is led to the sub-gallery 117 communicated to the outlet 116b of the oil filter 116 in parallel to the main gallery 115. This makes it possible to divide oil into at least two parts and feed the divided parts of oil to portions to be lubricated of the engine, and hence to equally feed oil to each portion to be lubricated. This is effective to sufficiently feed oil to the cylinder head 23 side of the system without increasing a pressure loss of the oil. Another advantage is simplifying the passage configuration from the sub-gallery 117 to the cylinder head 23 by taking the sub-gallery 117 as a passage specialized to feed oil to the cylinder head 23 side.

The sub-gallery 117 includes the first passage portion 117a and the second passage portion 117b. The first passage portion 117a extends in straight line so as to communicate the outlet 116b of the oil filter 116 to the oil cooler 118. The second passage portion 117b extends in straight line in the direction reversed to that of the first passage portion 117a. This is advantageous in simplifying the shape of the sub-gallery 117, thereby facilitating the ease of formation of the sub-gallery 117.

The sub-gallery 117 and the main gallery 115 are communicated with the outlet 11 8b of the oil cooler 118 and are provided in the crankcase 21 in such a manner that the axes thereof are parallel to the axis of the crankshaft 27. This is advantageous, in addition to the above-described simplification of the sub-gallery 117, in simplifying the shape of the main gallery 115, thereby facilitating the formation of the main gallery 115.

The center line of the sub-gallery 117, the center line of the main gallery 115, the center line of the communication passage 119 for communicating the outlet 118b of the oil cooler 118, and the center axes of the oil filter 116 and the oil cooler 118 are all located within the same plane. This facilitates the formation of the passages in the crankcase 21.

The discharge port 114 for connecting the oil pump 108 to the oil filter 116 is disposed under both the main gallery 115 and the sub-gallery 117 in such a manner that the axis thereof is perpendicular to the main gallery 115 and the sub-gallery 117. This allows the sub-gallery 117, the main gallery 115, and the discharge port 114 to be compactly disposed along the vertical direction.

The oil filter 116 and the oil cooler 118 are mounted on the outer wall surface of the crankcase 21 in such a manner as to be disposed in parallel. This allows the oil filter 116 and the oil cooler 118 to be compactly mounted to the crankcase 21 by making the distance between the axes of the oil filter 116 and the oil cooler 118 as short as possible.

A rotational power is transmitted from the crankshaft 27 to the intake side camshaft 79 and the exhaust side camshaft 80 with the timing transmission 85 having the cam chain 89. The screw lifter 94 having the lifter rod 103, with its first end being in contact with the tensioner arm 92 that is in sliding-contact with the cam chain 89, is provided in the cylinder head 23. The oil passage 126 to which oil is fed from the oil pump 108 is formed so as to extend round in the cylinder head 23, and the downstream end of the oil passage 126 is communicated to the screw type lifter 94. With this configuration, it is possible to prevent the pressure of oil fed from the oil pump 108 to the oil passage 126 extending around the cylinder head 23 from being reduced in mid-flow, and hence to certainly feed oil to the screw type lifter 94.

The oil passage 126 extending round in the cylinder head 23 is formed so as to pass through the sliding-contact portions between the intake side camshaft 79 and the exhaust side camshaft 80 and the cam journal wall 82 as one of the plurality of the cam journal walls 81 and 82 and the cam holder 84 fastened to the cam journal wall 82. This is effective to reliably lubricate the intake side camshaft 79 and the exhaust side camshaft 80.

The oil passage 126 extending around the cylinder head 23 includes the pair of annular grooves 128 and 134, the communication groove 135, and the pair of communication passages 127 and 136. The pair of annular grooves 128 and 134 are provided in the cam journal wall 82 and the cam holder 84 formed so as to rotatably support the intake side camshaft 79 and the exhaust side camshaft 80 in common. The annular grooves 128 and 134 are formed to surround the camshafts 79 and 80, respectively. The communication groove 135 is provided in at least one of the connection faces of the cam journal wall 82 and the cam holder 84 to the cylinder head 23 in such a manner as to connect the annular groove 128 to the annular groove 134. The pair of communication passages 127 and 136 are provided in a straight line in the cam journal wall 82 in such a manner as to be communicated with the annular grooves 128 and 134, respectively. With this configuration, of the oil passage 126 extending around the cylinder head 23, oil passage portions for lubricating the intake side camshaft 79 and the exhaust side camshaft 80 can be easily formed. Oil is fed from the sub-gallery 117 independent from the main gallery 115 to the oil passage 126 extending around the cylinder head 23. This prevents the pressure of oil to be fed to the main gallery 115 from being affected by feeding of oil in the cylinder head 23.

The block side return oil passage 142 communicated to the head side return oil passage 141 provided in the cylinder head 23 is provided in the cylinder block 19 in such a manner as to be communicated to the inside of the generator chamber 65 to return oil from the cylinder head 23 to the oil pan 22 side of the system through the generator chamber 65. The branch oil passage 143 communicated to the intermediate portion of the block side return oil passage 142 is provided in the cylinder block 19. The branch oil passage 143 is formed so as to allow part of the oil flowing in the block side return oil passage 142 to bypass the generator chamber 65 and to flow to the oil pan 22 side of the system.

Part of the oil led to the block side return oil passage 142 through the head side return oil passage 141 is branched to the branch oil passage 143 side of the system to flow to the oil pan 22 side while bypassing the generator chamber 65. With this configuration, it is possible to suppress the amount of oil led in the generator chamber 65 to a suitable value, and to comparatively reduce the agitating resistance of oil due to rotation of the rotor 66 of the generator 68. This is advantageous in preventing the oil temperature from being unnecessarily raised and friction loss from being increased.

The branch oil passage 143 is provided in the upper case portion 18 of the lower side of the cylinder block 19. The return oil passage 144 with its upper end communicated to the branch oil passage 143 and its lower end opened in the oil pan 22 is provided in the lower case 20 forming the crankcase 21 in cooperation with the upper case portion 18 in such a manner as to extend in the vertical direction. Accordingly, oil can be certainly led back to the oil pan 22 after flowing in the branch oil passage 143.

The guide portion 145 for leading the oil from the block side return oil passage 142 to the inside of the generator chamber 65 to the stator 67 side is provided on the inner surface of the generator cover 64. As a result, the oil having left the generator chamber 65 can be used only for cooling the stator 67 by eliminating the contact of the oil with the rotor 66 as much as possible. This makes it possible to realize effective cooling and to effectively reduce the agitating resistance of oil due to rotation of the rotor 66.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine for a vehicle comprising:
   an engine body having a cylinder block, a lower case, a cylinder head and a cylinder head cover;
   a plurality of pistons slidably fit within cylinders and being connected to a crankshaft via connecting rods;
   a rotor of a generator being connected to a first end of the crankshaft rotatably supported by a crankcase forming part of the engine body;
   a starting motor having a rotational axis, said starting motor being mounted at an approximately central portion of said engine body along a rotational axis of said crankshaft;
   an over-running clutch for inputting a rotational power from the starting motor, said rotational axis of said starting motor being parallel to the rotational axis of said crankshaft, wherein said over-running clutch is mounted to said engine body through a second end of said crankshaft; and
   a starting clutch being interposed between said crankshaft and a main shaft having a rotational axis parallel to the rotational axis of said crankshaft, said starting clutch being mounted to a first end of said main shaft, wherein said starting motor is disposed within an angular range defined by a cylinder axis (C) of said cylinders of said engine body and a straight line connecting the rotational axis of said crankshaft to the rotational axis of said main shaft, and along a plane perpendicular to the rotational axis of said crankshaft.

2. The engine according to claim 1, wherein said over-running clutch is mounted to the second end of said crankshaft at a position where said starting clutch is sandwiched between said over-running clutch and said starting motor in a direction along the rotational axis of said crankshaft.

3. The engine according to claim 2, further comprising a starting gear reducer including gears respectively fixed on both ends of a rotational shaft overlapping said starting clutch and rotatably supported by said engine body, wherein said starting gear reducer is provided between said starting motor and said over-running clutch.

4. The engine according to claim 1, wherein said starting motor is disposed behind said starting clutch on said crankshaft in such a manner that a part of said starting motor overlaps said starting clutch with respect to an axial direction of said crankshaft.

5. The engine according to claim 3, wherein said starting motor is disposed behind said starting clutch on said crankshaft in such a manner that a part of said starting motor overlaps said starting clutch with respect to an axial direction of said crankshaft.

6. The engine according to claim 1, wherein said over-running clutch further includes a clutch outer, a clutch inner and a plurality of sprags interposed between said clutch outer and the clutch inner.

7. The engine according to claim 6, wherein said clutch outer has cylindrical hubs fixed to the second end of the crankshaft.

8. The engine according to claim 5, wherein said over-running clutch further includes a clutch outer, a clutch inner and a plurality of sprags interposed between said clutch outer and the clutch inner.

9. The engine according to claim 8, wherein said clutch outer has cylindrical hubs fixed to the second end of the crankshaft.

10. The engine according to claim 9, wherein said starting clutch includes a clutch housing, a clutch center, a plurality of friction plates and a pressing plate.

11. The engine according to claim 2, wherein said starting motor is disposed at an approximately central portion of said engine body.

12. The engine according to claim 10, wherein said starting motor is disposed at an approximately central portion of said engine body.

13. The engine according to claim 3, wherein said starting gear reducer includes a pinion, a large-diameter gear, a small-diameter gear, an idle gear and a ring gear, wherein said pinion is affixed to an output shaft of said starting motor.

14. The engine according to claim 12, wherein said starting gear reducer includes a pinion, a large-diameter gear, a small-diameter gear, an idle gear and a ring gear, wherein said pinion is affixed to an output shaft of said starting motor.

15. A method of setting a bank angle of an engine on a motorcycle at a relatively high value, wherein said engine includes an engine having an engine body having a cylinder block, a lower case, a cylinder head and a cylinder head cover; a plurality of pistons slidably fit within cylinders and being connected to a crankshaft via connecting rods; a rotor of a generator being connected to a first end of the crankshaft rotatably supported by a crankcase forming part of the engine body; a starting motor having a rotational axis, said starting motor being mounted at an approximately central portion of said engine body along a rotational axis of said crankshaft; an over-running clutch for inputting a rotational power from the starting motor, said rotational axis of said starting motor being parallel to the rotational axis of said crankshaft, wherein said over-running clutch is mounted to said engine body through a second end of said crankshaft; and a starting clutch, said method comprising:

mounting said starting clutch between said crankshaft and a main shaft having a rotational axis parallel to the rotational axis of said crankshaft, and mounting said starting clutch to a first end of said main shaft, and mounting said starting motor in a position disposed within an angular range defined by a cylinder axis (C) of said cylinders of said engine body and a straight line connecting the rotational axis of said crankshaft to the rotational axis of said main shaft, and along a plane perpendicular to the rotational axis of said crankshaft.

16. The method according to claim 15, further comprising mounting said over-running clutch to the second end of said crankshaft at a position where said starting clutch is sandwiched between said over-running clutch and said starting motor in a direction along the rotational axis of said crankshaft.

* * * * *